UNITED STATES PATENT OFFICE.

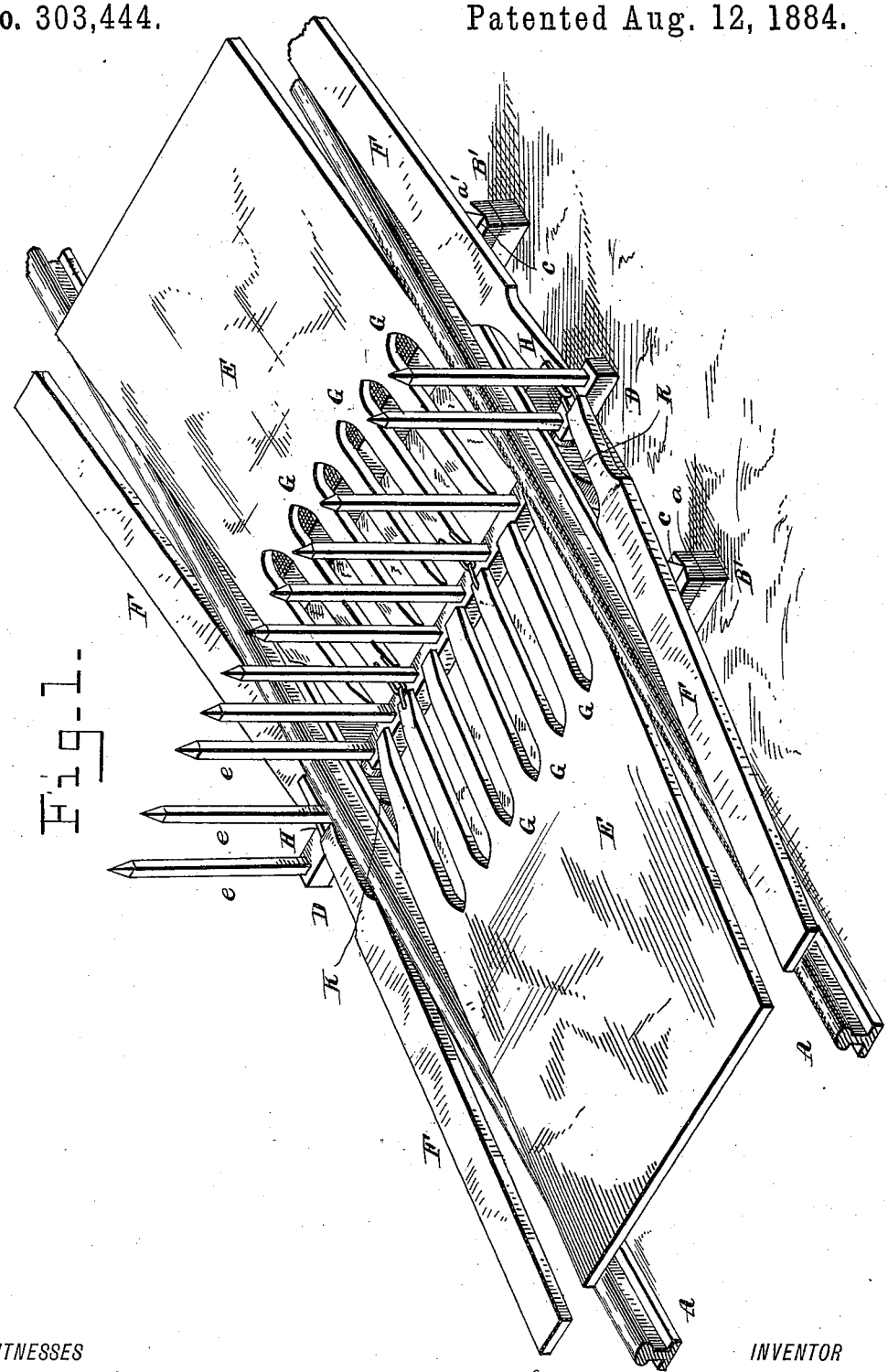

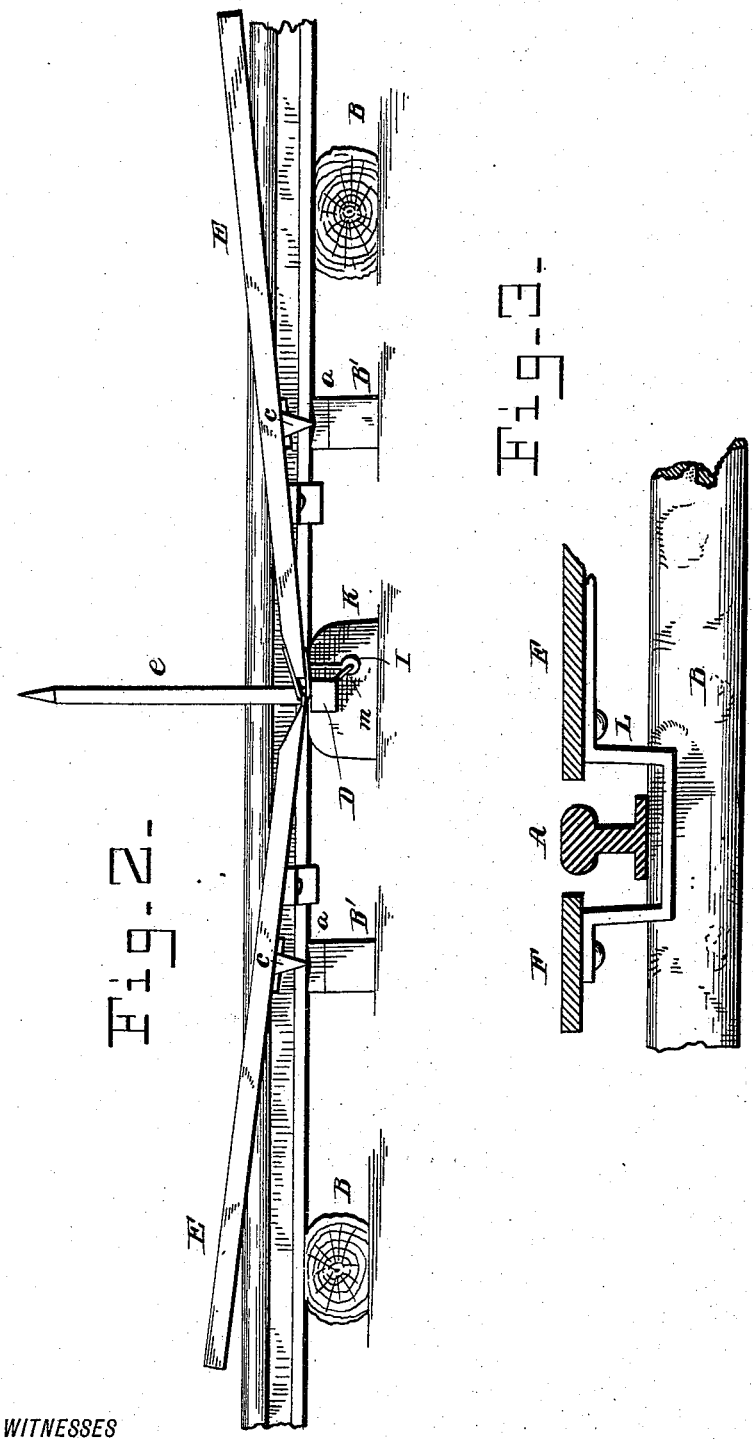

JUDSON O. M'CUTCHAN, OF MIDDLEBROOK, VIRGINIA.

PLATFORM FOR RAILWAY-GATES.

SPECIFICATION forming part of Letters Patent No. 303,444, dated August 12, 1884.

Application filed December 14, 1883. (No model.)

*To all whom it may concern:*

Be it known that I, JUDSON O. M'CUTCHAN, of Middlebrook, in the county of Augusta, and in the State of Virginia, have invented certain new and useful Improvements in a Platform Attachment to my Railway-Crossing Gate; and I do hereby declare that the following is a full, clear, and exact description thereof, reference being had to the accompanying drawings, and to the letters of reference marked thereon, making a part of this specification.

My invention relates to railroad-gates, and is intended to be used at road-crossings or at points where fences intersect the road; and the object I have in view is to make a gate the slats or palings of which will, when in normal position, lie in a plane with the plane of the rails, or nearly so, and which will be raised to a vertical position by the weight of an animal when attempting to pass over it, thus raising a barrier to its passage.

In the accompanying drawings, which make a part of this specification, Figure 1 represents a perspective view of my gate, the palings being in erect position, as if an animal were attempting to cross over it. Fig. 2 is a longitudinal section, and Fig. 3 a detached view, of some of the parts in cross-section.

In the figures, A represents the ordinary T-rail in general use.

B B represent two of the ties upon which the rails rest.

B' B' represent two sills which lie under the rails and parallel to the ties, and which are provided upon their upper sides with metal bearing-plates $a\ a$, which are slightly hollowed out on their upper surfaces.

E E represent two platforms made of suitable boards or iron plates, their inner ends meeting and being hinged or flexibly connected together. These platforms are provided with slots G G, which extend from their inner ends outward, the slots or openings being a little greater in length than the length of the slats or palings of the gate. They are also provided on their under sides with V-shaped metal pieces $c\ c$, which bear upon the plates $a\ a$, and form fulcrums upon which the platforms oscillate. The outer ends of the platforms are free to move up and down.

K K represent blocks which are firmly bedded—one under each of the rails—and in which are formed bearings for a cross-bar, D. This bar D lies beneath the rails, and to it are secured the slats or palings $e\ e$, for forming the gate. A metal loop, $m$, is held in the eye of an eyebolt, I, the loop being secured to the bar D and the bolt to the under side of one of the platforms, E in such manner that when pressure is put upon either of the platforms near enough to their inner ends to be beyond the fulcrums $c\ c$ the bar D will be caused to partially revolve, and thus elevate the palings to a vertical position, as shown in Figs. 1 and 2. When an animal walks upon one of the platforms and passes the fulcrum, the gate turns up in front of it and prevents its passage; but when it turns to leave and passes to the free ends of the platforms the bar D is partially rotated through or by means of the loop $m$ and bolt I, and the gate is thrown down to its normal position. F F are similar, but narrower, platforms located upon the outside of each of the rails. They are connected together at their inner ends, and rest upon V-shaped fulcrums. The platforms E and F are connected together by means of a metallic yoke, L, which passes under the rails. The four platforms being connected together, it will readily be seen that when pressure is put upon one the others will move with it to either raise or lower the palings of the gate. The palings rise and fall only upon one side of the bar D, and consequently enter the slots or openings in only one of the platforms. The openings in the other platforms are made in order to allow snow to pass through, so as not to weight it. It is contemplated to make the outer ends of the platforms sufficiently heavy to hold the gate down by their own weight. The bar in which the yoke is formed may extend under and be secured to all of the platforms. These platforms will of course be made of sufficient length to allow the gate to rise before the animal reaches it. Barbs may be secured on the sides of the pickets, near their ends, which will project (when the gate is down) just above the rails.

I prefer, as a general thing, to make the pickets of metal, though they may be made of other material.

Having thus fully described my invention, what I claim is—

1. The platforms E E and F F, slotted, connected, and fulcrumed as described, in combination with the gate and its connections thereto, the several parts operating substantially as and for the purpose set forth.

2. The bar D, provided with pickets or palings, in combination with its bearing-blocks K and a slotted platform to which it is connected, and by means of which it is operated in both directions, as and for the purpose specified.

In testimony whereof I affix my signature, in presence of two witnesses, this 26th day of September, 1883.

JUDSON O. M'CUTCHAN.

Witnesses:
 LOGAN TURNER,
 M. G. KERR.